United States Patent [19]

Weglarz et al.

[11] Patent Number: 5,003,953
[45] Date of Patent: Apr. 2, 1991

[54] TRANSIENT FUEL INJECTION

[75] Inventors: Michael W. Weglarz, Utica, Mich.; Michael T. Vincent, Sterling, Mass.; James F. Prestel, Rochester; Paul G. Sisoler, Warren, both of Mich.

[73] Assignee: Chrysler Corporation, Highland Park, Mich.

[21] Appl. No.: 523,454

[22] Filed: May 14, 1990

[51] Int. Cl.$^5$ ............................................. F02D 41/04
[52] U.S. Cl. .................................... 123/478; 123/492
[58] Field of Search ............... 123/472, 476, 478, 480, 123/486, 488, 490, 492, 493, 299; 364/431.05

[56] References Cited

U.S. PATENT DOCUMENTS

| | | | |
|---|---|---|---|
| 4,266,275 | 5/1981 | Marchak | 123/492 X |
| 4,523,570 | 6/1985 | Suzuki et al. | 123/478 |
| 4,565,174 | 1/1986 | Suzuki et al. | 123/478 |
| 4,574,761 | 3/1986 | Isomura et al. | 123/478 |
| 4,582,035 | 4/1986 | Kishi | 123/478 |
| 4,593,665 | 6/1986 | Kishi | 123/478 |
| 4,602,603 | 7/1986 | Honkanen et al. | 123/416 |
| 4,762,107 | 8/1988 | Schöneck et al. | 123/478 |
| 4,782,806 | 11/1988 | Hatanaka | 123/478 X |
| 4,911,131 | 3/1990 | Nakaniwa et al. | 123/478 X |

Primary Examiner—Willis R. Wolfe
Attorney, Agent, or Firm—Mark P. Calcaterra

[57] ABSTRACT

In a fuel control system for an engine equipped with fuel injectors, a method where the fuel injector is fired to fuel its cylinder, relative to the cylinder's valve events, more than once per cycle if a throttle transient has occurred and caused the original firing of the fuel injector to be less than the fuel amount now required by the new engine operating conditions.

1 Claim, 9 Drawing Sheets

TRANSIENT FUEL INJECTION

BACKGROUND OF THE INVENTION

1. Field of the Invention

The present invention relates generally to fuel injection for engines of automotive vehicles, and more particularly to electronic control of the firing of fuel injectors on an engine for an automotive vehicle.

2. Description of Related Art

Typically, an engine of an automotive vehicle has one or more fuel injectors for delivering fuel from a fuel source to cylinders of an internal combustion engine. Generally, a sensor on a distributor of the engine transmits a signal from the distributor as to the crank angle of the engine. This distributor reference signal is received by an electronic control unit (ECU) which outputs a signal to fire the fuel injectors at predetermined states of the distributor reference signal.

Currently, multi-port fuel injection systems consist of either "grouped" or "banked" fuel injector firings (e.g., injectors fired in pairs, two at a time) or "sequential" fuel injector firings (e.g., injectors fired sequentially one at a time) Both of these systems typically utilize the distributor reference signal to synchronize the firing of the fuel injectors with the engine s valve events. The time when a cylinder's fuel injector is fired relative to that cylinder's valve event is constant for every firing of that fuel injector.

In normal sequential fuel injector timing, each cylinder is fired in a sequential order. However, a need exists to vary the time when a fuel injector is fired to fuel a cylinder, relative to that cylinder's valve events. For example, during engine idle conditions, it may be desired to inject fuel into the cylinder when an intake valve is open, while during engine acceleration conditions, it may be desired to inject fuel well before the intake valve opens to obtain the best fuel preparation Also, a need exists to inject fuel when an engine transient occurs after an initial fuel injector pulse is delivered to avoid a lean or rich engine operating condition.

SUMMARY OF THE INVENTION

It is, therefore one object of the present invention to provide a method of firing fuel injectors for an engine of an automotive vehicle for sequential fuel injection.

It is another object of the present invention to eliminate a lean or rich engine operating condition for firing fuel injectors as a result of an engine transient.

It is a further object of the present invention to eliminate the driveability problem of engine bucking/undershooting that may result from a lean engine operating condition.

To achieve the foregoing objects, the present invention is a method of firing fuel injectors for an engine of an automotive vehicle. The method includes the steps of determining which injector is at the last possible time for firing the fuel injectors and calculating a change in pulse width for the fuel injector. The method also includes determining whether the calculated change in pulse width is greater than a minimum transient fuel pulse and firing the fuel injectors if determined not greater. The method further includes calculating a transition pulse width if determined greater and firing the fuel injectors with the transition pulse width to deliver a calculated amount of fuel.

One advantage of the present invention is that the fuel injectors are fired in bi-modal sequential operation. Another advantage of the present invention is that a transient fuel injection strategy is provided. Still another advantage of the present invention is that a lean or rich operating condition of the engine is eliminated when an engine transient occurs. Yet another advantage of the present invention is that the transition fuel eliminates the lean operating condition, thereby eliminating the driveability problem of engine bucking/undershooting.

Other objects, features and advantages of the present invention will be readily appreciated as the same becomes better understood from the following description and the accompanying drawings.

DESCRIPTION OF THE PREFERRED EMBODIMENT(S)

Figure 9:
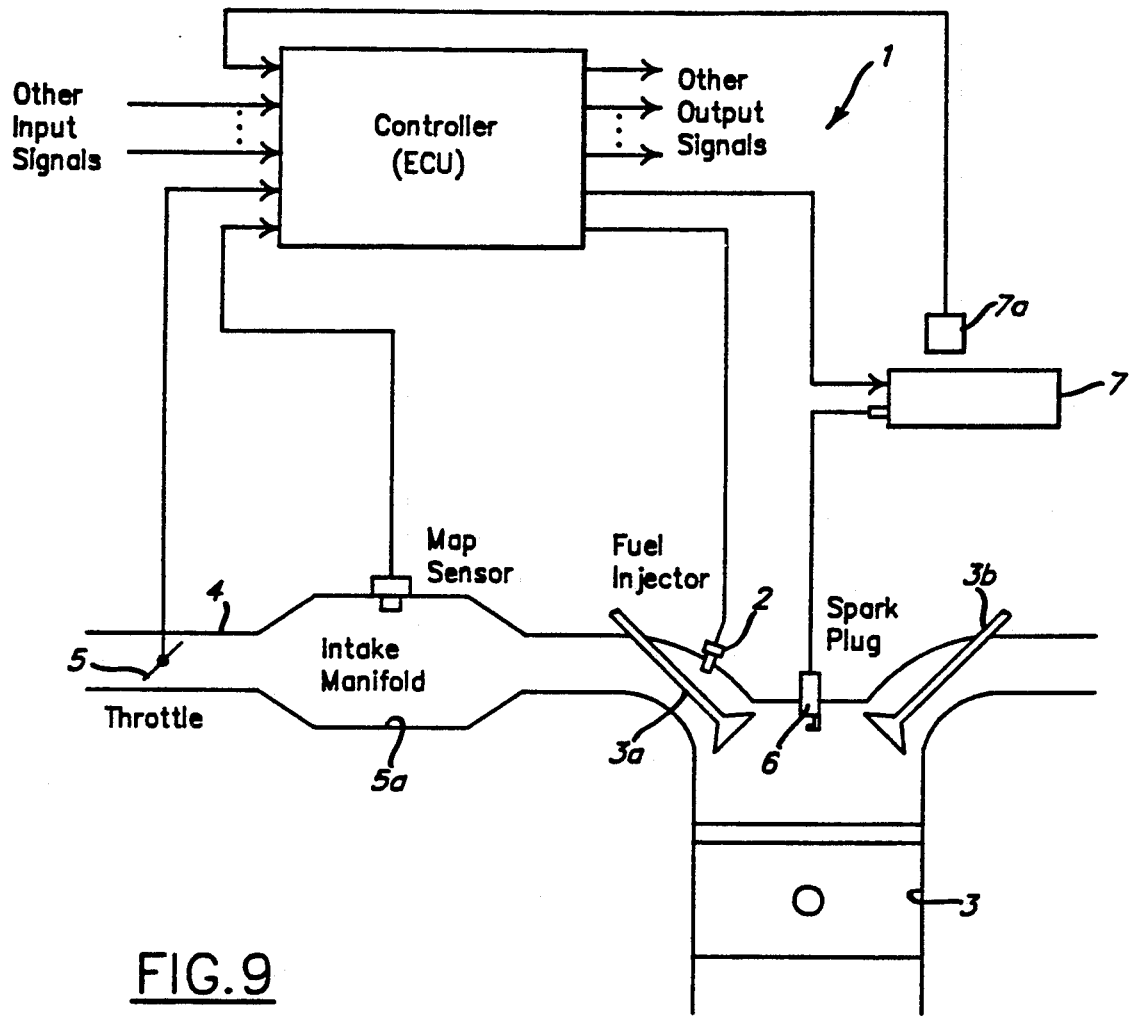
FIG. 9 is a schematic view of a fuel injection system incorporating the present invention.

Referring to FIG. 9, a schematic view of a fuel injection system 1 is shown for an automotive vehicle (not shown) Under normal operating conditions, fuel is delivered from a fuel source (not shown) through fuel lines (not shown) to at least one fuel injector or actuator 2 The fuel injector 2 is conventional and injects fuel from fuel lines into at least one individual cylinder 3 of an internal combustion engine of the automotive vehicle. In the preferred embodiment, the engine has four cylinders 3 and four fuel injectors 2, one fuel injector 2 for each cylinder 3. The cylinder 3 also has an intake valve 3a and an exhaust valve 3b which are conventional. The fuel injection system 1 also includes a throttle body 4 having a throttle valve 5. The throttle valve 5 is opened, closed or at a position therebetween for allowing or preventing air to enter an intake manifold 5a and flow to the cylinders 3 of the engine. Fuel from the fuel injectors 2 is mixed with air in the cylinders 3 in a known manner.

The fuel injection system 1 further includes a spark plug 6 for each cylinder 3 of the engine. The spark plug 6 is connected by a plug wire to a distributor 7. The distributor 7 sends an electrical signal to the spark plugs 6 to ignite the fuel and air mixture in the cylinders 3 at predetermined time intervals. A sensor 7a, such as a Hall-Effect sensor, is located near the distributor 7. An example of such a sensor and distributor may be found in U.S. Pat. No. 4,602,603 issued July 29, 1986, to Honkanen et al. and assigned to the same assignee as the present invention, the disclosed material of which is hereby incorporated by reference.

The sensor 7a and distributor 7 are electrically connected to an electronic control unit (ECU) 8, including memory, which receives a pickup or distributor reference signal of the crank angle or position of the engine. The ECU 8 outputs a signal to the distributor 7 to fire the spark plugs 6. The fuel injectors 2 are also electrically connected to the ECU 8 which outputs a signal to fire the fuel injectors 2 The fuel injectors 2 are fired sequentially, e.g. one at a time, for sequential fuel injection The ECU 8 interfaces with several transducers or sensors which monitor various engine parameters such as the engine temperature (TMP), engine speed (RPM), engine manifold absolute pressure (MAP), etc.

Figure 1:
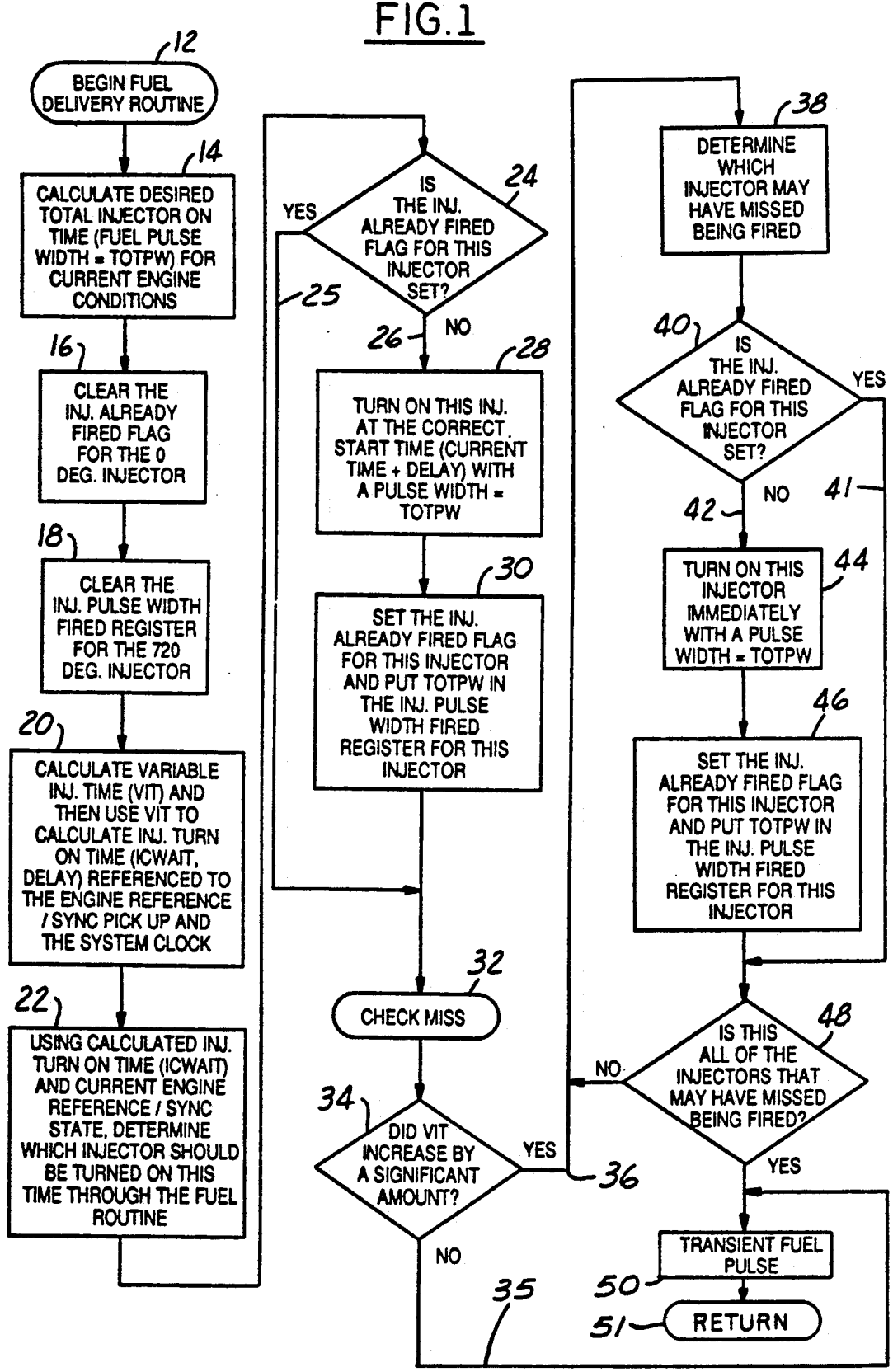
FIG. 1 is a flowchart of a method of firing fuel injectors according to the present invention.

Referring to FIG. 1, a flowchart for a method of firing at least two or more fuel injectors for sequential fuel injection according to the present invention is shown. The methodology enters through bubble 12 to begin the fuel delivering routine at the occurrence of a reference pick-up edge of the distributor reference signal and falls through to block 14. In block 14, the methodology calculates a desired total fuel injector "ON" time or pulse width (TOTPW) for current engine operating conditions. The ECU 8 calculates TOTPW from values provided by the sensors or transducers monitoring the engine temperature, the engine RPM. the engine MAP, etc. The calculated desired total fuel injector pulse width value is then stored by the ECU 8 in memory for further use. The methodology then proceeds to block 16.

In block 16, the methodology clears or resets an injector already fired indicator or flag for a zero (0) degree fuel injector. The zero degree fuel injector is that fuel injector 2 which corresponds to the cylinder whose open intake valve 3a entertains the last possible reference pick-up edge of the distributor reference signal. It should be appreciated that the zero degree fuel injector may be arbitrarily chosen.

Once the injector already fired flag is cleared for the zero degree fuel injector, the methodology falls through to block 18 and clears or resets an injector pulse width fired register for a seven hundred twenty (720) degree fuel injector. The injector pulse width fired register indicates the length of the last pulse width fired by the seven hundred twenty fuel injector. The methodology then proceeds to block 20.

At block 20, the methodology calculates a variable injection time (VIT) for the fuel injector. The methodology then uses the calculated VIT value to calculate an injector turn on time (ICWAIT and DELAY) referenced to the engine reference/synchronization pick-up and an internal clock of the ECU 8 This calculation is done by multiplying the ignition period value by the number of cylinders 3 and then subtracting the VIT value If the end of the injector pulse width timing is being controlled instead of the beginning, then the total fuel injector pulse width is also subtracted. Next, the methodology advances to block 22.

The VIT valve is calculated off the distribution reference signal so that the most current ignition period (the time between consecutive, similar reference pick-up edges), engine speed (RPM). manifold absolute pressure (MAP), throttle position, and total injector pulse width (TOTPW) data is used in the calculation by the ECU 8. The VIT value is calculated by a table interpolation, mathematical equation, or some other method involving the use of engine data.

The fuel injector firing start or turn on time can now be loaded into a timer to trigger the firing of the appropriate fuel injector 2. However, this may introduce significant error, since the engine parameters can change vastly before the fuel injector is ever fired (possibly up to four ignition periods from the current reference pick-up edge). The fuel injector turn on time is instead converted into two separate values, ICWAIT and DELAY. ICWAIT is the quotient and DELAY is the remainder of the fuel injector turn on time divided by the ignition period. From ICWAIT and the current state of the reference and synchronization pick-ups (e.g., a cylinder counter), the fuel injector that is to be fired within one ignition period from the current reference pick-up edge is determined. Then if this fuel injector has not already been fired, it is fired at a DELAY time from the current pick-up edge By performing the VIT value calculation every falling edge of the reference pick-up signal and converting it to an ICWAIT and DELAY values, the fuel injector turn on time calculation error is reduced to the error induced by the changes in engine parameters occurring over only one ignition period.

At block 22, the methodology uses the calculated fuel injector turn on time (ICWAIT) and the current engine reference/synchronization pick-up state to determine which fuel injector is to be turned on this time through the fuel delivery routine. The methodology then falls through to decision block 24.

At decision block 24, the methodology determines whether the fuel injector already fired flag for the fuel injector to be turned on has already been set. If the fuel injector already fired flag has been set, the methodology proceeds via path 25 to bubble 32 and begins to check for a fuel injector 2 that missed firing as will be discussed further subsequently herein. In decision block 24, if the injector already fired flag has not been set, the methodology proceeds to block 28 by way of path 26 In block 28, the methodology or ECU 8 turns on the fuel injector 2 at the correct starting time (CURRENT TIME+DELAY) for a time equal to the calculated total fuel injection pulse width (TOTPW). Continuing on into block 30, the methodology then sets the injector already fired flag for the fired fuel injector and loads the calculated total fuel injection pulse width (TOTPW) into the injector pulse width fired register for the fired fuel injector. Proceeding to bubble 32, the methodology checks to see that the fuel injectors 2 have fired. The methodology then advances to decision block 34.

At decision block 34, the methodology determines whether the variable injection timing (VIT) has increased by a predetermined amount. As the VIT value increases, the ICWAIT value decreases, which in turn, decreases the fuel injector turn on time. If the fuel injector turn on time is decreased enough, a fuel injector will miss firing. This is more fully discussed in connection with FIG. 3 and 4 to be described. A fuel injector missing its firing time is directly related to an increase in VIT value. If the VIT value has not increased by a predetermined amount in decision block 34, the methodology determines or concludes that all fuel injectors have fired and proceeds via path 35 to block 50. At block 50, the methodology enters the transient fuel pulse routine of FIG. 3 to be described. The methodology then advances to bubble 51 and returns.

Returning to decision block 34, if the VIT value has increased by a predetermined amount, the methodology proceeds by way of path 36 to block 38. In block 38, the methodology determines which fuel injector may have missed being fired. The methodology then advances to decision block 40 In decision block 40, the methodology checks whether the injector already fired flag, of the possibly missed fuel injector, has been set. If the injector already fired flag has been set for this fuel injector, the methodology proceeds to decision block 48 via path 41. If the injector already fired flag has not been set, meaning that the fuel injector has missed being fired, the methodology falls through to block 44 along path 42.

In block 44, the methodology or ECU 8 immediately turns on the missed fuel injector with a pulse width equal to the total calculated fuel injector pulse width (TOTPW). Once the missed fuel injector is fired, the methodology advances to block 46 and sets its fuel injector already fired flag and its pulse width length is stored in the appropriate fuel injection pulse width fired register. The methodology then falls through to decision block 48.

In decision block 48, the methodology then determines if all of the fuel injectors that may have missed being fired have subsequently been updated and fired. If they have not, the methodology then proceeds back to block 38 previously described. If all of the fuel injectors that may have missed being fired have subsequently been fired, the methodology advances to block 50 to be described.

Figure 2:
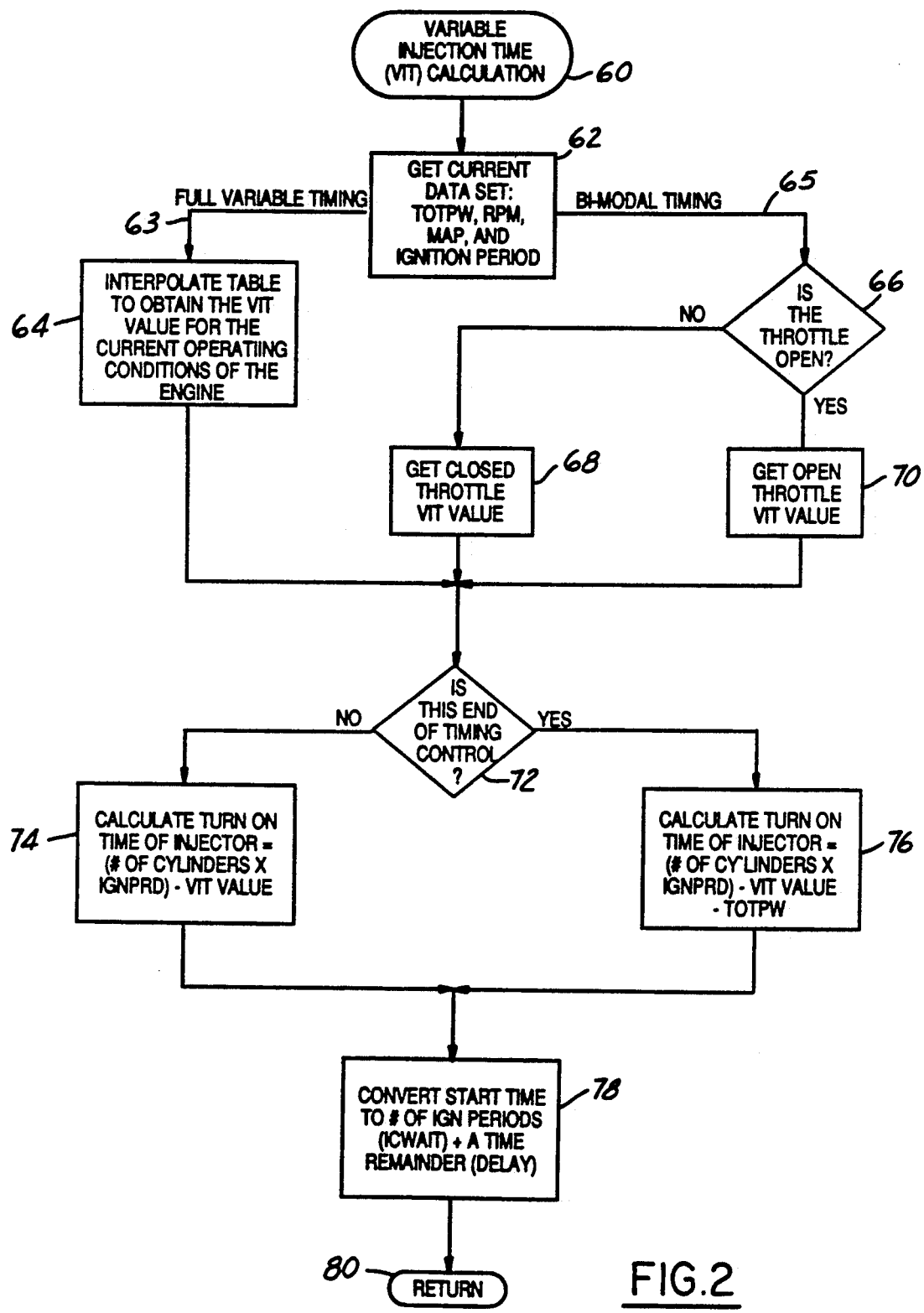
FIG. 2 is a flowchart showing the calculation of sequential variable fuel injection time for the method of FIG. 1.

Referring to FIG. 2, a flowchart of the methodology for calculating the variable injection timing (VIT) of block 20 for the fuel delivery routine of FIG. 1 is shown. The methodology enters through bubble 60 and falls through to block 62.

In block 62, the methodology retrieves the current engine operating parameters, including engine RPM, engine MAP, ignition period and the total calculated fuel injection pulse width (TOTPW) Also in block 62, the ECU 8 determines whether full variable fuel injection timing or bi-modal fuel injection timing is to be calculated based on the current engine operating parameters. If full variable fuel injection timing is to be calculated, the methodology proceeds to block 64. In block 64, the methodology, based upon the current operating conditions of the engine, obtains the VIT value using an interpolation table. The methodology then advances to decision block 72 to be described.

Returning to block 62, if bi-modal fuel injection timing is to be calculated, the methodology advances to decision block 66. In decision block 66, the methodology determines whether the engine parameters require mode #1 VIT timing. The ECU 8 accomplishes this by determining whether the throttle of the engine is open. If the throttle is open, the methodology advances to block 70 and obtains an open throttle bi-modal or mode #2 VIT value. If the throttle is not open, the methodology advances to block 68 and obtains a closed throttle bi-modal or mode #1 VIT value. Upon leaving either block 68 or block 70, the methodology advances to decision block 72. It should be appreciated that the modes may be controlled or determined by other suitable means or parameters than the throttle position.

In decision block 72, the methodology determines whether it is the end of timing control for variable end of injection timing (more fully discussed in FIG. 3) or variable start of injection timing (more fully discussed in FIG. 4) which is to be calculated. Variable end of injection timing uses a VIT value that is referenced off of the end of the calculated total fuel injection pulse width to calculate the injector turn on time, while variable start of injection timing uses a VIT value referenced off of the start of the calculated total fuel injection pulse width to calculate the injector turn on time, hence the respective names.

If variable end of injection timing is to be used, the time that the fuel injector 2 is to be turned on is calculated in block 76 by multiplying the number of cylinders 3 contained in the engine by the ignition period and then subtracting the VIT value and the total fuel injection pulse width. The method then falls through to block 78.

If variable end of injection timing is not to be used, in other words, variable start of injection timing is to be used, the time at which the fuel injector 2 is to be turned on is calculated in block 74 by multiplying the number of engine cylinders 3 by the ignition period and then subtracting the VIT value. The method then falls through to block 78.

The fuel injector start or turn on time calculated in either block 74 or block 76 is then converted in block 78 into a number of ignition periods. ICWAIT, and a time remainder, DELAY, as previously described. This is accomplished by dividing the fuel injector start or turn on time by the ignition period. The methodology is then passed to bubble 80 where it returns or is released from the VIT calculation algorithm.

Figure 3:
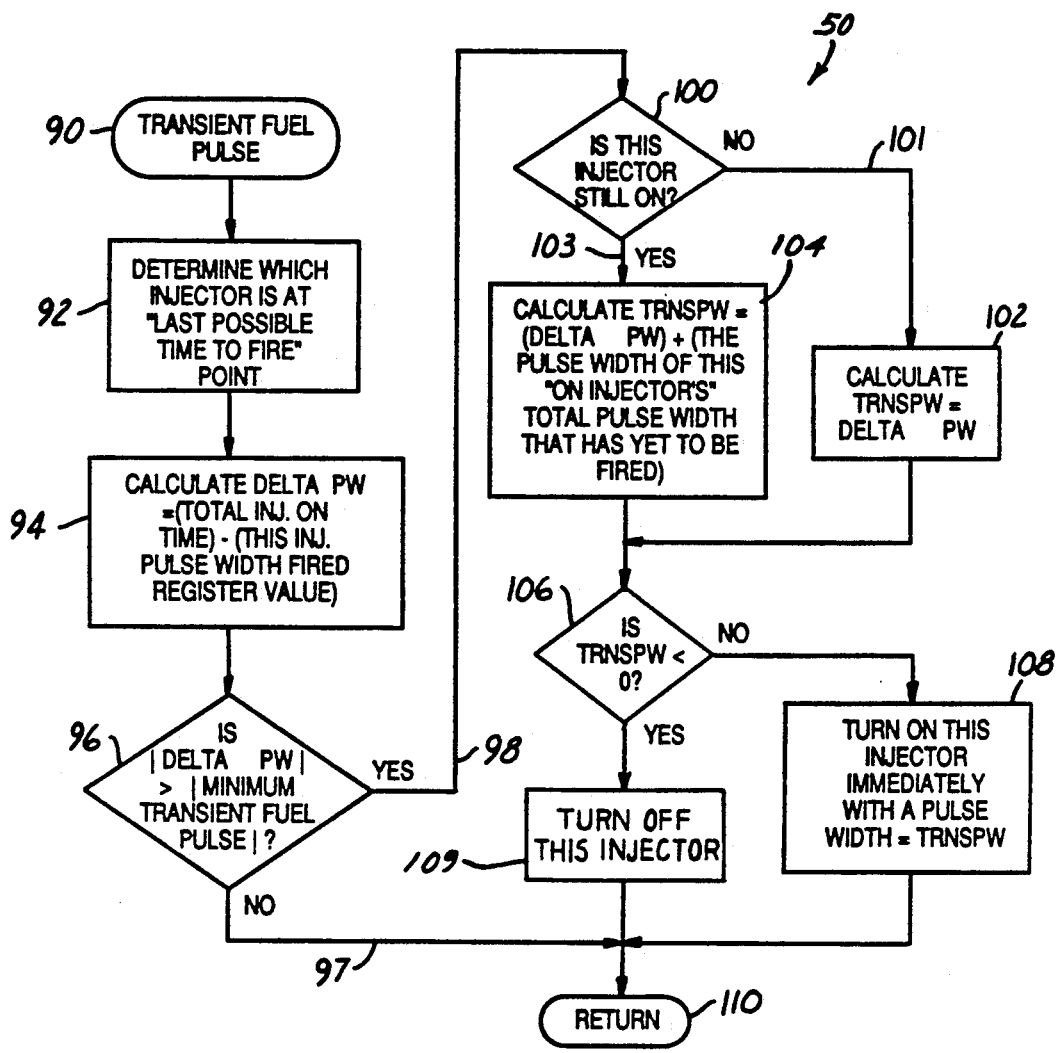
FIG. 3 is a flowchart of a method of the transient fuel injection pulse width calculation and the firing of an injector with the appropriate transient fuel injection pulse.

FIG. 3 is a flowchart of the methodology for a transient fuel injection pulse routine of block 50 of FIG. 1. The methodology begins in oval 90 and falls through to block 92.

In block 92, the methodology determines which fuel injector 2 is at the "last possible time to fire" point. Since the fuel delivery routine for the engine may be performed every falling edge of the reference pick-up, the "last possible time to fire" point may be arbitrarily chosen to be the reference pick-up edge just prior to the corresponding intake valve opening event. This enables the transient fuel pulse to be inducted during the perspective cylinder's intake cycle. The method then proceeds to block 94.

In block 94, the ECU 8 calculates a delta pulse width (DELTAPW) value by taking the current total injector pulse width and subtracting the regular injection mode pulse width that was already delivered by this injector. In other words, the ECU 8 calculates DELTAPW by taking the total injector on time and subtracting this from the current injector pulse width fired register value. The methodology then proceeds to decision block 96, where the magnitude of DELTAPW is compared to the magnitude of the minimum transient fuel pulse which is a predetermined or calibrated value. If the magnitude of DELTAPW is less than or equal to the magnitude of the minimum transient fuel pulse, the methodology follows path 97 to bubble 110 where it returns or is released from the transient fuel injection pulse routine. If the magnitude of DELTAPW is greater than the magnitude of the minimum transient fuel pulse, the methodology follows path 98 to decision block 100.

In decision block 100, the methodology determines if the fuel injector 2 is still on from the regular mode injection. If the fuel injector 2 is still on, the methodology follows path 103 to block 104. In block 104, the ECU 8 calculates a transient pulse width value (TRNSPW) by adding DELTAPW to the amount of pulse width that the fuel injector 2 must stay on to complete the regular mode injection. In other words, the ECU 8 calculates TRNSPW by adding DELTAPW and the pulse width of this "on injector's" total pulse width that has yet to be fired. The methodology then falls through to decision block 106.

Returning to decision block 100, if the fuel injector 2 is not still on, the methodology follows path 101 to block 102. In block 102, the ECU 8 calculates TRNSPW by setting it equal to DELTAPW. The methodology then advances to decision block 106.

In decision block 106, the methodology determines if TRNSPW is negative (meaning the fuel injector should already be off for the current engine parameters) or less than a predetermined value such as zero. If TRNSPW is negative, the ECU 8 turns off this fuel injector 2 immediately. The methodology then falls through to bubble 110 and returns If TRNSPW is not negative, the methodology advances to block 108 and the ECU 8 fires or turns on this fuel injector 2 immediately with a pulse width equal to TRNSPW. The methodology then falls through to bubble 110. In bubble 110, the methodology is returned from the transient fuel injection pulse routine. It should be appreciated that the transient fuel injector pulse strategy may be used with grouped or sequential fuel injector firing systems.

In operation at the reference pick-up edge just before the intake valve is opened (this edge was arbitrarily chosen), the ECU 8 checks to see if a significant change in the size of the fuel injector pulse width (due to an engine transient) has occurred since the last firing of this injector. If such a transition did occur, the ECU 8 calculates a transient fuel injection pulse width in one of two ways, depending on whether the fuel injection pulse width has increased or decreased due to the transient.

If the new fuel injection pulse width has increased by a significant amount, the transient fuel injection pulse width (TRNSPW) is calculated by the following formula:

TRNSPW = [current fuel inj. pulse width] − [total fuel injection pulse width previously fired by this injector]

Then, if this fuel injector 2 is still on from the previous firing, the amount of time left for the fuel injector 2 to stay on is added to the transient fuel injection pulse width. The fuel injector 2 is then fired again with a pulse width equal to the transient fuel injection pulse width just calculated. This extra firing makes up for the extra fuel required by the engine transient. The net pulse width fired by this injector over this cycle now equals the current pulse width required by the current engine operating conditions.

If the fuel injection pulse width decreases by a significant amount, the transient fuel injection pulse width (TRNSPW) is again calculated by the following formula:

TRNSPW = [current fuel inj. pulse width] − [total fuel injection pulse width previously fired by this injector]

Then, the ECU 8 checks to see if the fuel injector 2 is still on from the previous firing. If the fuel injector 2 is off, it is too late to decrease the previously fired pulse width, and therefore, nothing is done If the fuel injector 2 is still on, the time left for the fuel injector 2 to stay on is added to the transient fuel injection pulse width. If the calculated transient fuel injection pulse width is a negative value, meaning the fuel injector 2 should already be off for the current engine operating conditions, then the fuel injector 2 is turned off immediately. If the transient fuel injection pulse width value is not negative, the fuel injector 2 is then fired again with a pulse width equal to the transient fuel injection pulse width just calculated. This new firing decreases the original total pulse width fired by the fuel injector 2, so that the net pulse width fired by this fuel injector over this cycle now equals the current pulse width required by the current engine operating conditions.

Figure 4:
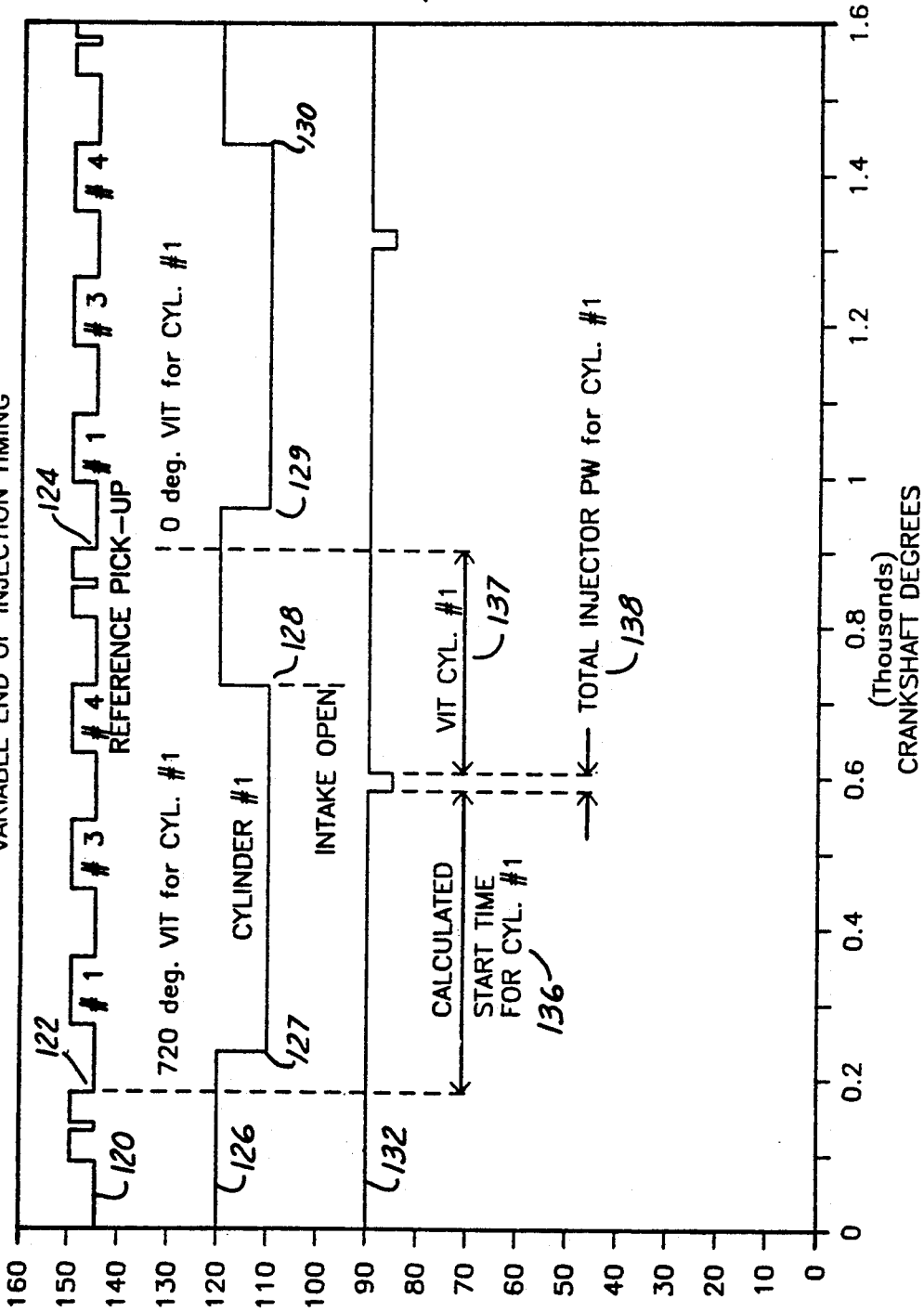
FIG. 4 is a graph illustrating a reference timing signal, an injector timing signal, and timing points for relating the VIT values to end of injection timing control applied to a four cylinder engine.

FIG. 4 is a graph illustrating various aspects of sequential variable fuel injection timing and, more particularly, the calculation of the starting or turn on time for the fueling of a cylinder 3 when the VIT value is referenced from the end of the calculated total fuel injector pulse width for one cylinder of a four cylinder engine. Line 120 represents the distributor reference signal used to synchronize the firing of the fuel injectors with the engine's valve events. Point 124 of line 120 is the arbitrarily chosen zero (0) degree reference point and point 122 is the arbitrarily chosen seven hundred twenty (720) degree reference point for the cylinder #1 injector. It should be appreciated that the 0 degree and the 720 degree reference points are actually the same point as far as the reference signal is concerned. However, the 0 degree and 720 degree points are not the same points in time. The 720 degree reference point is the 0 degree reference point for the following 720 degree cycle. Line 126 is a schematic representation showing the occurrence of the intake valve events of cylinder #1. Points 127 and 129 of line 126 indicate cylinder #1 intake valve closing events and points 128 and 130 of line 126 indicate cylinder #1 intake valve opening events.

Line 132 is a schematic representation showing the firing of the cylinder #1 injector. Point 134 indicates the injector turn on event and point 135 indicates the injector turn off event Dimension 137 is the calculated VIT value as described in FIG. 2. Note that the VIT value is defined as being measured from the end of the 720 degree range to the fuel injection pulse and not from the start of the 720 degree range. This may be chosen simply for convenience. It should be appreciated that the VIT value could have been defined from the start of the 720 degree range to the fuel injection pulse. Dimension 138 is the total injector pulse width (TOTPW) for cylinder #1 as described in FIG. 1. The start time for the firing of the fuel injector of that cylinder is calculated by multiplying the number of cylinders 3 in the engine (in this case 4) by the ignition period and then subtracting both the VIT value and the total fuel injection pulse width. This is shown as dimension 136.

Figure 5:
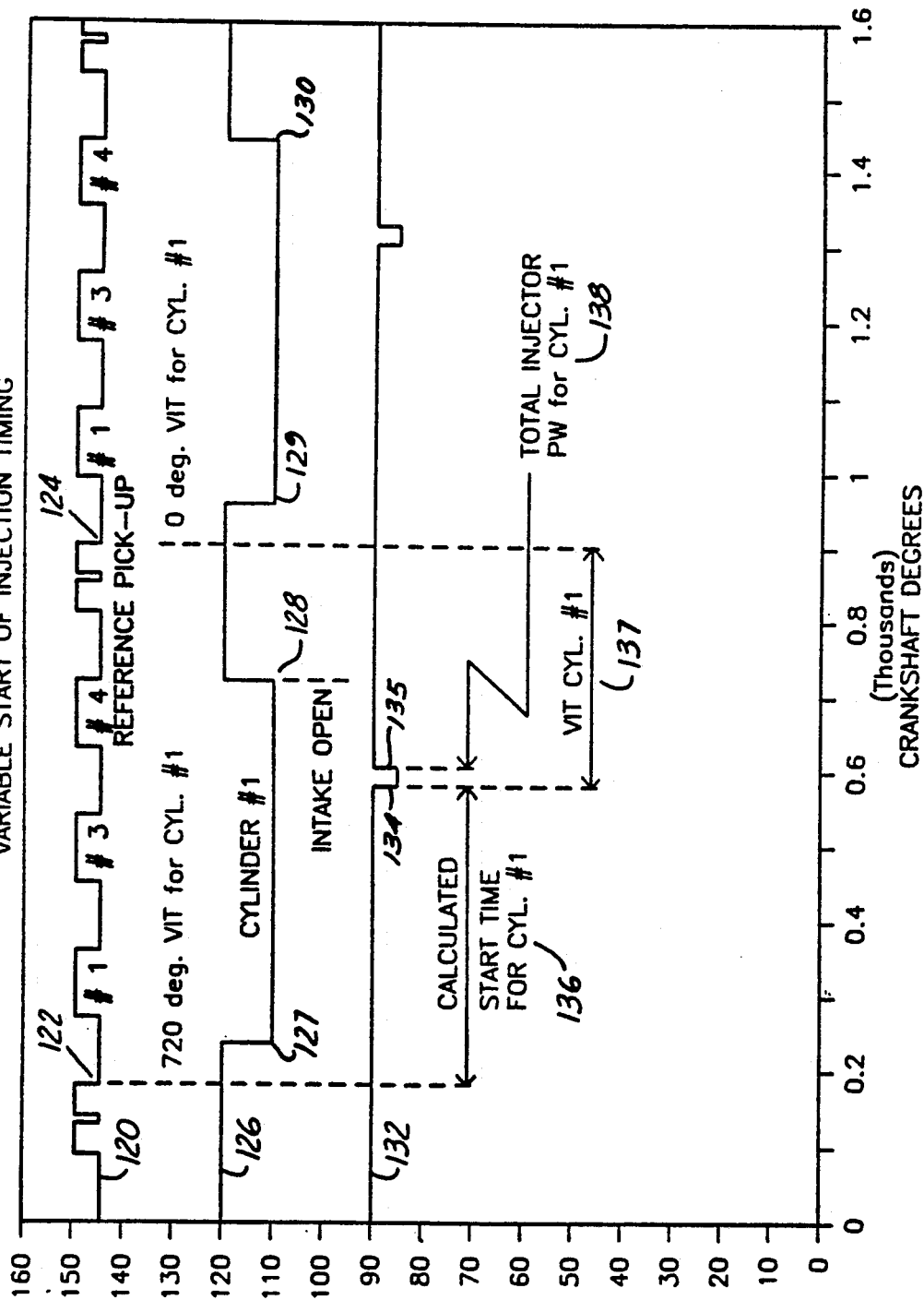
FIG. 5 is a graph illustrating a reference timing signal, an injector timing signal, and timing points for relating the VIT values to start of injection timing control applied to a four cylinder engine.

FIG. 5 is also a graph illustrating the various aspects of sequential variable fuel injection timing. It differs from FIG. 4 in that the calculation of the start time for the firing of the fuel injector 2 is for when the VIT value is referenced to the start of the calculated total fuel injection pulse width (TOTPW) and not the end. In this manner, the start time for the firing of the fuel injectors 2 is calculated by multiplying the number of cylinders 3 by the ignition period and then subtracting the VIT value. Dimensions 136 and 137 of FIG. 5 are shown to reflect referencing the VIT value to the start of the TOTPW.

Figure 6:
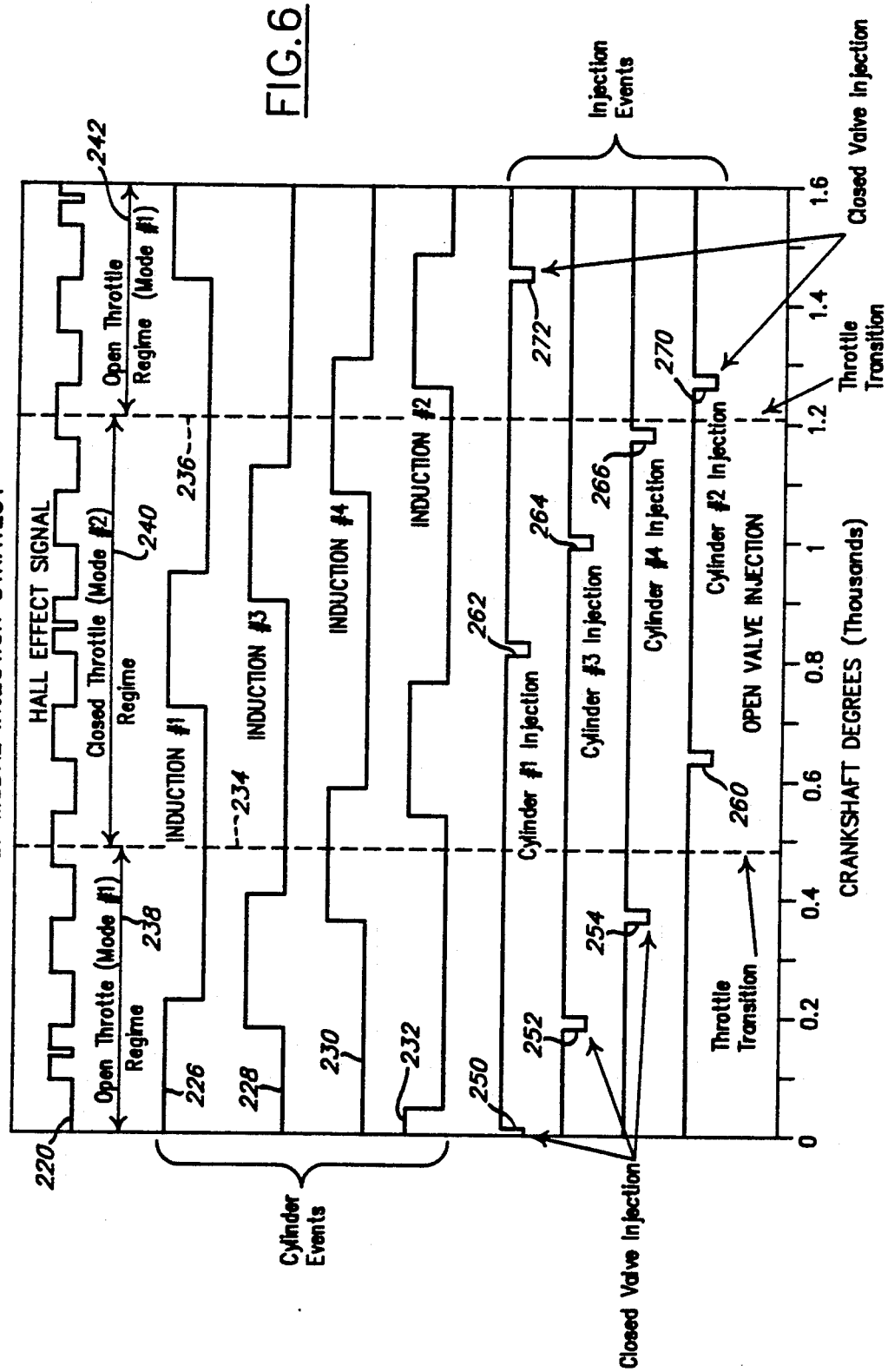
FIG. 6 is a graph illustrating bi-modal VIT strategy using throttle position as the VIT mode controller applied to a four cylinder engine.

FIG. 6 is a graph illustrating the aspects of the bimodal VIT strategy, with throttle position as the VIT mode controller. Line 220 represents the distributor reference signal used to synchronize the firing of the fuel injectors with the engine's valve events. Lines 226, 228, 230, and 232 are the schematic representations showing the occurrences of the intake valve events for cylinder #1, cylinder #3, cylinder #4, and cylinder #2. It should be appreciated that the firing order of this particular engine is 1, 3, 4, 2.

In the first regime (shown by dimension 238), the throttle is in an open position. The ECU 8 determines the VIT value to be the mode #1 value and uses this value to determine the turn on time for all the firings of the fuel injectors 2 when operating within this regime. It should be appreciated that for each injector fired in the mode #1 regime, the fuel injector pulse widths (points 250, 252, and 254) all start on the falling edge of the distributor reference signal (line 220) occurring at the respective cylinder's intake valve opening event. This falling edge timing point is the arbitrarily chosen mode #1 VIT point.

At the time when the throttle closes (line 234), the ECU 8 determines the VIT value to be the mode #2 value and uses this value to determine the turn on time for the fuel injectors 2 when operating in the closed throttle, mode #2, regime (shown as dimension 240). In the mode #2 regime, all fuel injector firings (points 260, 262, 264, and 266) all start on the first rising edge of the distributor reference signal (line 220) within the respective cylinder's open valve event. The first rising edge within a cylinder's open valve event is the arbitrarily chosen mode #2 VIT point.

The state of the throttle position then changes from closed to open (mode #2 to mode #1) at line 236. The ECU 8 now determines the VIT value to be the mode #1 value (the falling edge occurring at the respective cylinder's intake valve opening event) and all subsequent fuel injector firings (points 270 and 272) occur at the mode #1 VIT points.

Figure 7:
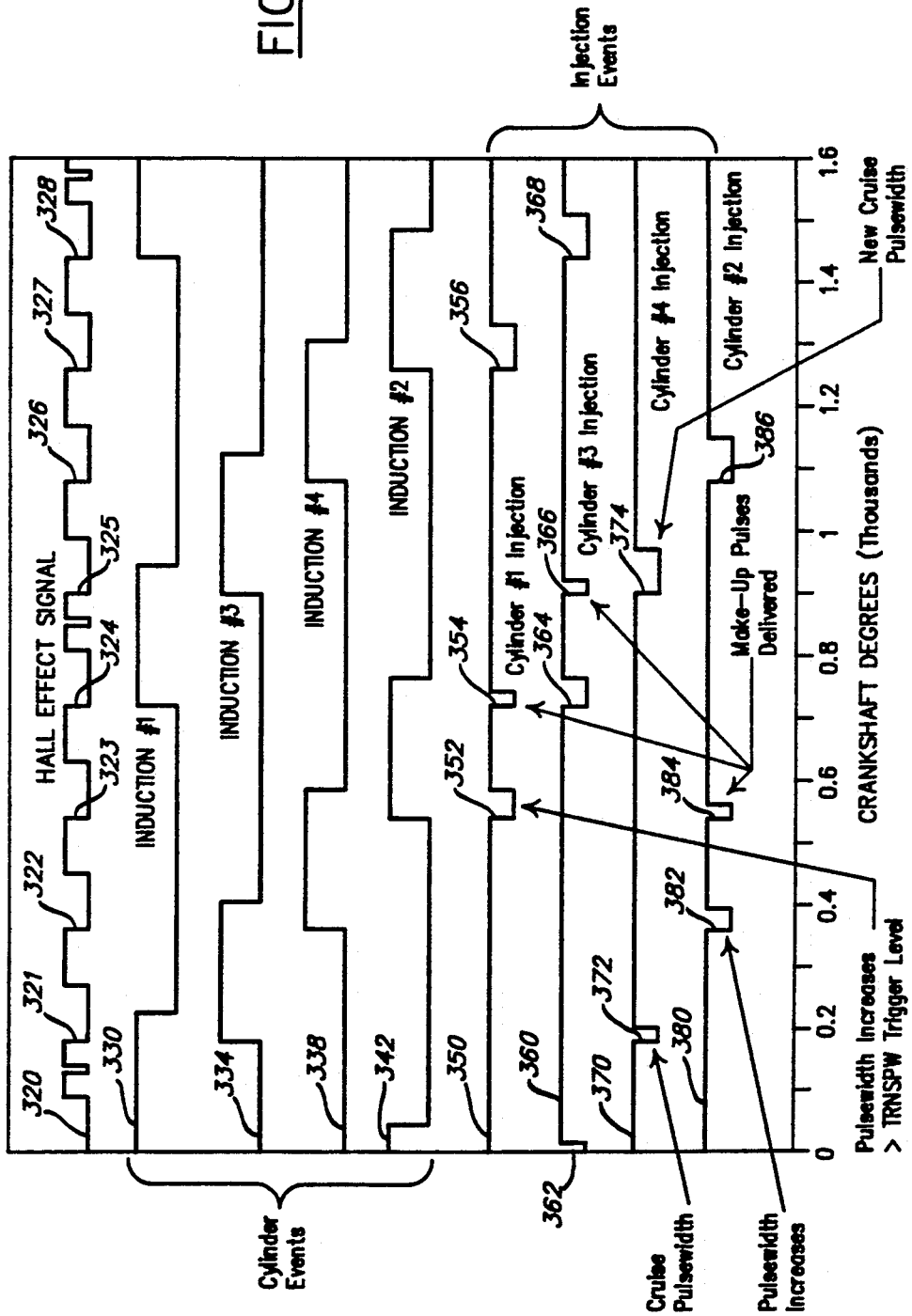
FIG. 7 is a graph illustrating several aspects of the transient fuel injection pulse strategy as applied to a four cylinder engine.

FIG. 7 is a graph illustrating various aspects of the transient fuel injection pulse strategy. Line 320 represents the distributor reference signal used to synchronize the firing of the fuel injectors with the engine's valve events. Lines 330, 334, 338, and 342 are schematic representations showing the occurrences of the intake valve events for cylinder #1, cylinder #3, cylinder #4, and cylinder #2, respectively. It should be appreciated that the firing order of this particular engine is 1, 3 4, 2. Lines 350, 360, 370, and 380 are schematic representations showing the firings of the fuel injectors 2 for cylinder #1, cylinder #3, cylinder #4, and cylinder #2, respectively.

The fuel delivery routine for this particular engine is performed at every major falling edge of the reference timing signal (points 321 through 328 of line 320). The standard fuel injection firing has been set by the ECU 8 to fire the appropriate fuel injector 2 for each cylinder 3 at the second falling edge of the distributor reference signal before the induction event of that corresponding cylinder. More specifically, the standard injection timing for cylinder #1 are falling edges 323 and 327, for cylinder #3 are falling edges 324 and 328, for cylinder #4 are falling edges 321 and 325, and for cylinder #2 are falling edges 322 and 326. Also, as described earlier in FIG. 3, the "last possible time to fire" points for each cylinder of this particular engine was arbitrarily assigned as the falling edge just prior to the intake valve event of each corresponding cylinder. Therefore, the "last possible time to fire" points for cylinder #1 are edges 324 and 328, and for cylinder #2 are edges 323 and 327.

At the left most portion of the graph, from 0 to 0.2 thousand crankshaft degrees, the engine is operating in a cruise condition. During a cruise, the engine parameters do not change significantly and therefore, the fuel injection pulse width does not change significantly. At event 321, cylinder #4 is fueled with a fuel pulse width equal to the current cruise pulse width (372). Also at event 321, the current pulse width is compared to the pulse width already fired for cylinder #3 (it should be appreciated that edge 321 is the "last possible time to fire" point for cylinder #3). Since the engine has been operating in a cruise condition, there is no significant difference between the two pulse widths and therefore, no transient fuel injection pulse is required by cylinder #3.

Now, from event 321 (0.18 thousand crankshaft degrees) through event 325 (0.9 thousand crankshaft degrees), the engine is operating under a transient condition which causes the fuel injection pulse width to increase over this period. Between events 321 and 322, the pulse width increases by a small amount. At edge 322, cylinder #2 is fueled with a fuel injection pulse width equal to the new, larger value (point 382). Also at edge 322, since it is a "last possible time to fire" point for cylinder #4, the ECU 8 compares the new fuel injection pulse width (382) to the pulse width already fired by cylinder #4 (372). Since the pulse width increased by only a small amount (less than the TRNSW value), a transient fuel pulse is not delivered to cylinder #4 at this time.

The pulse width continues to increase between events 322 and 323. At event 323, a standard fuel injection firing using the new fuel injection pulse width (352) is delivered to cylinder #1. Event 323 is also a "last possible time to fire" point for cylinder #2 and therefore, the new fuel pulse width (352) is compared to that already fired by cylinder #2 (382). Now, since the comparison reveals that the fuel pulse width increased by a significant amount (greater than the TRNSPW value), the ECU 8 fuels cylinder #2 again with a transient fuel pulse width (384).

Continuing on through the engine transient period, the fuel injection pulse width again increases by a significant amount between events 323 and 324. Therefore, like that at edge 323, the fuel injector firings at edge 324 consist of a standard fuel injector firing (point 364) for cylinder #3 and a transient fuel injector firing (point 354) for cylinder #1.

The fuel injection pulse width increases by the final amount between events 324 and 325. Again, the fuel injector firings at edge 325 consist of a standard fuel injector firing (point 374) and a transient fuel injector firing (point 366).

From event 325 through the end of the graph, the engine is operating under a new cruise condition. The engine parameters do not change significantly over this period and therefore, the fuel injection pulse width does not change significantly over this period. The ECU 8 thus delivers only standard fuel injection pulses (points 386, 356, and 368) in a sequential order over this period.

Figure 8:
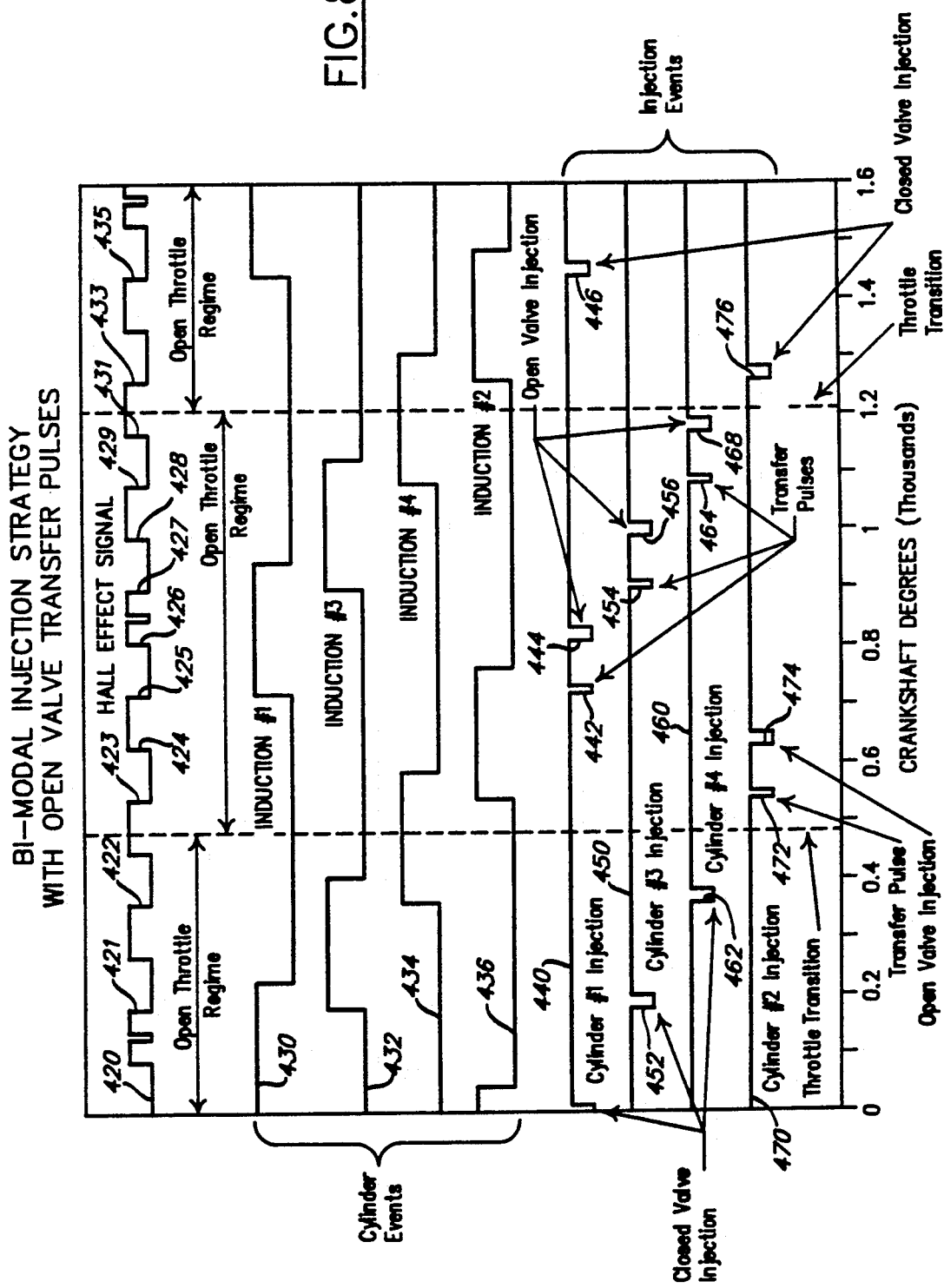
FIG. 8 is a graph illustrating the use of transfer pulses employed to provide for smooth engine operation during fuel injection transitions from a closed valve reference pick-up edge to an open valve reference pick-up edge.

FIG. 8 is a graph illustrating various aspects of the open valve fuel injection transfer pulse strategy. Line 420 represents the distributor reference signal used to synchronize the firing of the fuel injectors 2 with the engine's valve events. Lines 430. 432, 434, and 436 are schematic representations showing the occurrences of the intake valve events for cylinder #1, cylinder #3, cylinder #4, and cylinder #2, respectively. It should be appreciated that the firing order of this particular engine is 1, 3, 4, 2. Lines 440. 450, 460 and 470 are schematic representations showing the firings of the fuel injectors 2 for cylinder #1, cylinder #3, cylinder #4, and cylinder #2, respectively.

The fuel delivery routine for this particular engine is performed at every major falling edge of the reference timing signal (points 421 and 422 of line 420) during closed valve injection. For this particular application the bi-modal injection strategy is employed with closed valve injection occurring when the throttle valve is open. This condition occurs at the left most portion of the graph up to approximately 0.48 thousand crankshaft degrees with cylinder #3 being fueled at point 452 corresponding to event 421 (of line 420) while cylinder #4 is fueled at point 462 corresponding to event 422 (of line 420). At this point a throttle transition is encountered which, for this particular application, serves as the input for requiring a change in the fuel injection timing to open valve injection. At this time a decision to deliver the pulse width, as determined by the current engine operating conditions, on the open valve reference pick-up edge is made. This occurs at points 474, 444, 456 and 468 corresponding to events 424, 426. 428 and 431 of line 420 for cylinders #2, #1, #3 and #4, respectively. At this time, for one cylinder firing for each cylinder of the engine after the transfer signal is received, a decision is made to also deliver a fixed duration pulse width on the closed valve reference pick-up edge. These transfer pulses are delivered at points 472, 442, 454 and 464 corresponding to events 423, 425, 427 and 429 of line 420 for cylinders #2, #1, #3 and #4, respectively.

If it is determined that a fuel injection transition back to the closed valve injection reference pick-up edge (as shown at approximately 1.21 thousand crankshaft degrees indicated by a throttle transition in this particular case) is required, the next cylinder to be fueled after the determination is made will be fueled for closed valve injection. In the example shown in FIG. 8, cylinder #4 has been fueled for open valve injection at point 468. The throttle transition is encountered and it is determined that closed valve injection is now required. Cylinder #2 is now fueled at point 476 corresponding to event 433 of line 420. Following in sequential pattern cylinder #1 is fueled at point 446 corresponding to event 435 of line 420.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. In a fuel injection system for an engine of an automotive vehicle including a plurality of cylinders, a spark plug for each of the plurality of cylinders, a distributor electrically connected to the spark plug, a throttle body having a throttle valve connected to the engine to allow or prevent air to the plurality of cylinders, a fuel source, at least one fuel line connected to the fuel source, a plurality of fuel injectors connected to the fuel line for delivering fuel to the plurality of cylinders, a sensor located near the distributor for sensing predetermined states of the distributor, and an electronic control unit (ECU) electrically connected to the sensor, distributor and fuel injectors for receiving signals from the sensor and outputting signals to fire the distributor and fuel injectors, a method of firing the fuel injectors, said method comprising the steps of:

determining which injector is at the last possible time for firing the fuel injector;

calculating a change in pulse width for the fuel injector;

determining whether the calculated change in pulse width is greater than a minimum transient fuel pulse;

firing the fuel injectors if determined not greater;

calculating a transition pulse width if determined greater; and firing the fuel injectors with the transition pulse width to deliver a calculated amount of fuel.

* * * * *